United States Patent [19]

Zehnder

[11] 4,032,262
[45] June 28, 1977

[54] HOUSING ARRANGEMENT FOR A TWO-STAGE EXHAUST-GAS TURBOCHARGER

[75] Inventor: Gottlieb Zehnder, Kirchdorf, Switzerland

[73] Assignee: BBC Brown Boveri & Company Limited, Baden, Switzerland

[22] Filed: Dec. 16, 1975

[21] Appl. No.: 641,305

[30] Foreign Application Priority Data

Dec. 18, 1974   Switzerland ..................... 16879/74

[52] U.S. Cl. ................................ 417/409; 60/612; 415/219 R

[51] Int. Cl.² .................. F04B 17/00; F02B 33/44; F01D 25/24

[58] Field of Search .......... 417/407, 409, 360, 243, 417/247, 245; 415/201, 219 R; 60/597, 598, 38.16 R, 612

[56] References Cited

UNITED STATES PATENTS

| | | | |
|---|---|---|---|
| 1,310,682 | 7/1919 | Sherbondy | 417/407 |
| 2,677,932 | 5/1954 | Forsling | 417/409 |
| 2,785,635 | 3/1957 | Johnson | 417/409 |
| 2,811,302 | 10/1957 | Hodge et al. | 417/409 |
| 2,828,066 | 3/1958 | Wellauer | 417/245 |
| 3,001,692 | 9/1961 | Schierl | 415/66 |
| 3,523,428 | 8/1970 | Nagyszalanczy | 417/407 |

FOREIGN PATENTS OR APPLICATIONS

| | | | |
|---|---|---|---|
| 1,284,515 | 1/1962 | France | 417/409 |
| 2,233,970 | 11/1973 | Germany | 417/409 |
| 1,092,113 | 11/1967 | United Kingdom | 417/409 |

*Primary Examiner*—Carlton R. Croyle
*Assistant Examiner*—L. J. Casaregola
*Attorney, Agent, or Firm*—Toren, McGeady and Stanger

[57] ABSTRACT

In a two-stage exhaust-gas turbocharger the shafts for each stage are disposed in laterally spaced, parallel relation. The exhaust-gas turbine of each stage is arranged within the same housing which can be a common housing or a twin housing with the housing parts joined together by flange connections. The bearing for the end of each shaft located adjacent the turbine is positioned within the housing while the bearing for the opposite end of the shaft associated with the compressor is positioned outside the housing.

7 Claims, 3 Drawing Figures

HOUSING ARRANGEMENT FOR A TWO-STAGE EXHAUST-GAS TURBOCHARGER

SUMMARY OF THE INVENTION

The present invention concerns a two-stage exhaust-gas turbocharger for internal combustion machines, consisting of at least two turbochargers, each comprising a compressor and an exhaust-gas turbine, with one of the two turbocharges operating as a high-pressure stage and the second as a low-pressure stage, the compressor of the low-pressure stage is connected ahead of the compressor of the high-pressure stage, while the low-pressure exhaust-gas turbine is connected after the high-pressure exhaust-gas turbine.

For a long time exhaust-gas turbocharging has been generally established as a means of increasing the power output of diesel and gas engines, the aim being to raise the main effective pressure by pressure charging and, if possible, to lower the specific fuel consumption.

Exhaust-gas turbochargers with multi-stage compressors and turbines have been known for a long time. The first exhaust-gas turbochargers, for example, were equipped with a two-stage centrifugal compressor having backward-curved blades. The required pressure ratio could in this way be achieved with high efficiency (Brown Boveri Review, Vol. 52, No. 3, March 1965).

Two-stage exhaust-gas turbochargers are also known in which the two turbochargers are arranged coaxially in order to avoid long gas paths between the high-pressure turbine and the low-pressure turbine. The use of axially arranged turbines permits simple variation of the pressure-drop distribution. In this known configuration the low-pressure compressor drawing in the charging air is driven by the high-pressure turbine receiving its flow medium from the engine, and the high-pressure compressor supplying flow medium to the engine is driven by the low-pressure turbine through which the flow passes from the high-pressure turbine. With this known arrangement, diversion means are provided between the high-pressure turbine and the low-pressure turbine in order to deflect the exhaust-gas flow so that both turbines are moved in the same direction (British Pat. No. 1 092 113).

In another known embodiment of a two-stage exhaust-gas turbocharger, the turbine and compressor of the high-pressure stage and the turbine and compressor of the low-pressure stage are each arranged on a shaft, and the exhaust-gas outlet of the turbine of the high-pressure exhaust-gas turbocharger passes directly without any intervening deflection device into the exhaust-gas inlet of the turbine of the low-pressure exhaust-gas turbocharger, which rotates in the opposite direction (DAS 2 233 970).

These known embodiments of two-stage exhaust-gas turbochargers incur a number of problems compared with singlestage pressure charging, particularly with regard to the space occupied, and the weight and location of the center of gravity of the combined system in a diesel engine.

Therefore, the object of the invention is to create a two-stage exhaust-gas turbocharger incorporating short flow paths between the gas outlet housing of the high-pressure turbine stage and the gas inlet housing of the low-pressure turbine stage, so that space is saved, and costly connections, thermal expansion joints, and the like are avoided.

This object is achieved by providing a common housing for both the exhaust-gas outlet of the high-pressure stage and the exhaust-gas inlet of the low-pressure stage, and the two turbine shafts of the high-pressure and low-pressure stages are arranged in laterally spaced axially parallel relation to one another.

The advantage of arranging the exhaust-gas outlet of the high-pressure stage and the exhaust-gas inlet of the low-pressure stage in a common housing lies particularly in a small structural volume, a major saving in weight and above all a favorable position of the center of gravity of the engine. Furthermore, additional exhaust-gas ducting is rendered unnecessary, resulting not only in reduced assembly costs, but also in a better pressure ratio for the turbine of the high-pressure stage.

In another preferred form of a two-stage exhaust-gas turbocharger, a common housing is also provided for the exhaust-gas inlet of the high-pressure stage and the exhaust-gas outlet of the low-pressure stage.

In addition, the exhaust-gas inlet of the high-pressure stage and the exhaust-gas outlet of the low-pressure stage can be contained in separate housings.

This arrangement allows great freedom regarding the possibilities of fitting the ducts passing to and from the high-pressure gas inlet and low-pressure gas outlet, whereupon better use can be made of the restricted possibilities of mounting the system on the engine.

According to another aspect of the invention a common housing is provided for the entire exhaust-gas flow both of the high-pressure stage and of the low-pressure stage.

Through this structural measure it is possible to dispense with an additional flange connection required between the two parts of the housing, i.e. between the housing of the exhaust-gas outlet of the high-pressure stage and the exhaust-gas inlet of the low-pressure stage, and also for the housing for the exhaust-gas inlet of the high-pressure stage and the exhaust-gas outlet of the low-pressure stage.

It is of particular benefit if the bearings of the two axially parallel turbine shafts are located outside the common housing.

The advantage of this arrangement of the bearings lies particularly in the fact that none of the bearings is exposed to the hot exhaust gases, and also that the bearings can be easily supervised and replaced.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive material in which there are illustrated and described preferred embodiments of the invention.

DETAILED DESCRIPTION OF THE INVENTION

Figure 1:
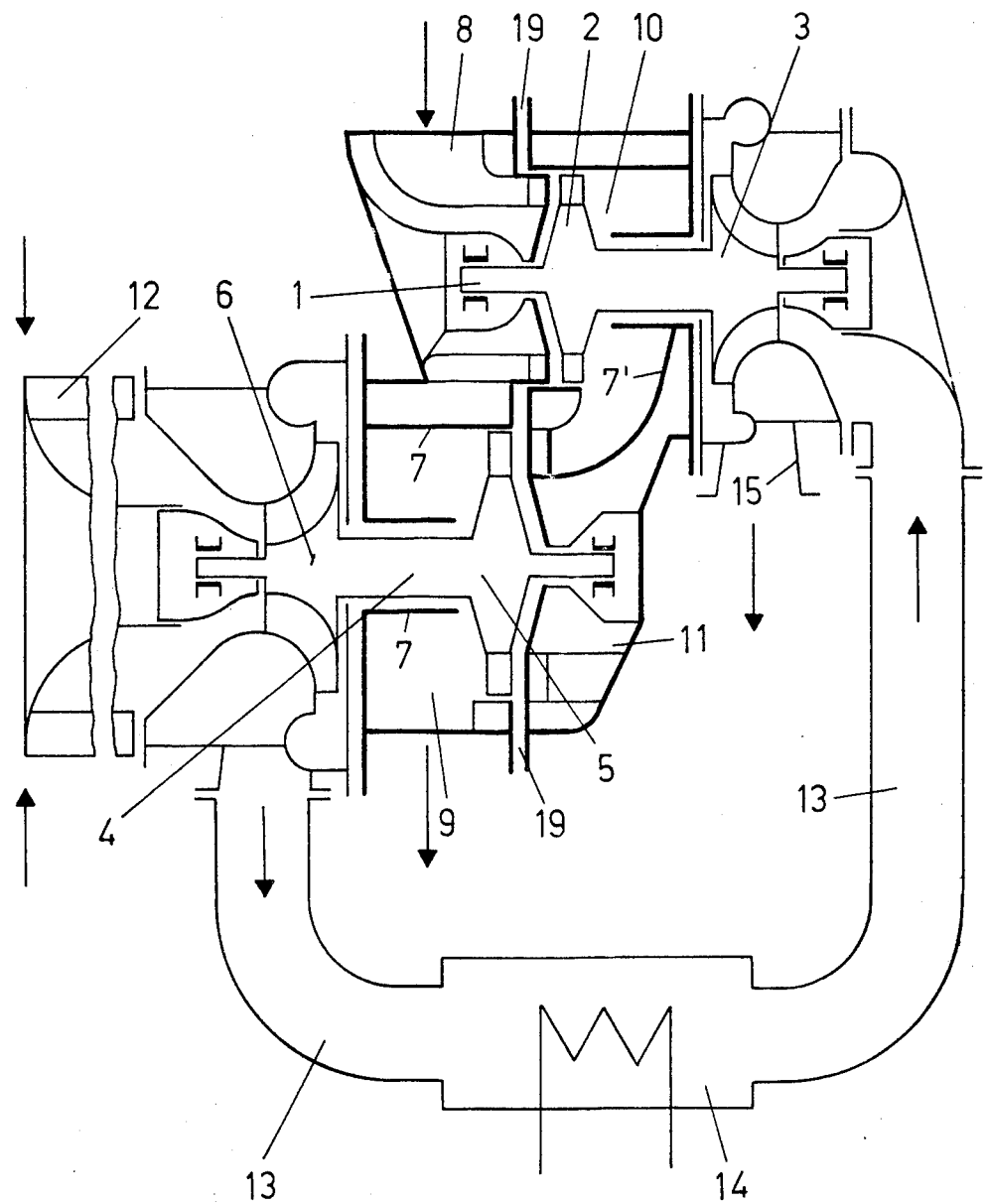
FIG. 1 is a cross-sectional view of a two-stage exhaust-gas tubocharger having a common housing for the gas outlet of the high-pressure stage and the gas inlet of the low-pressure stage.
Figure 2:
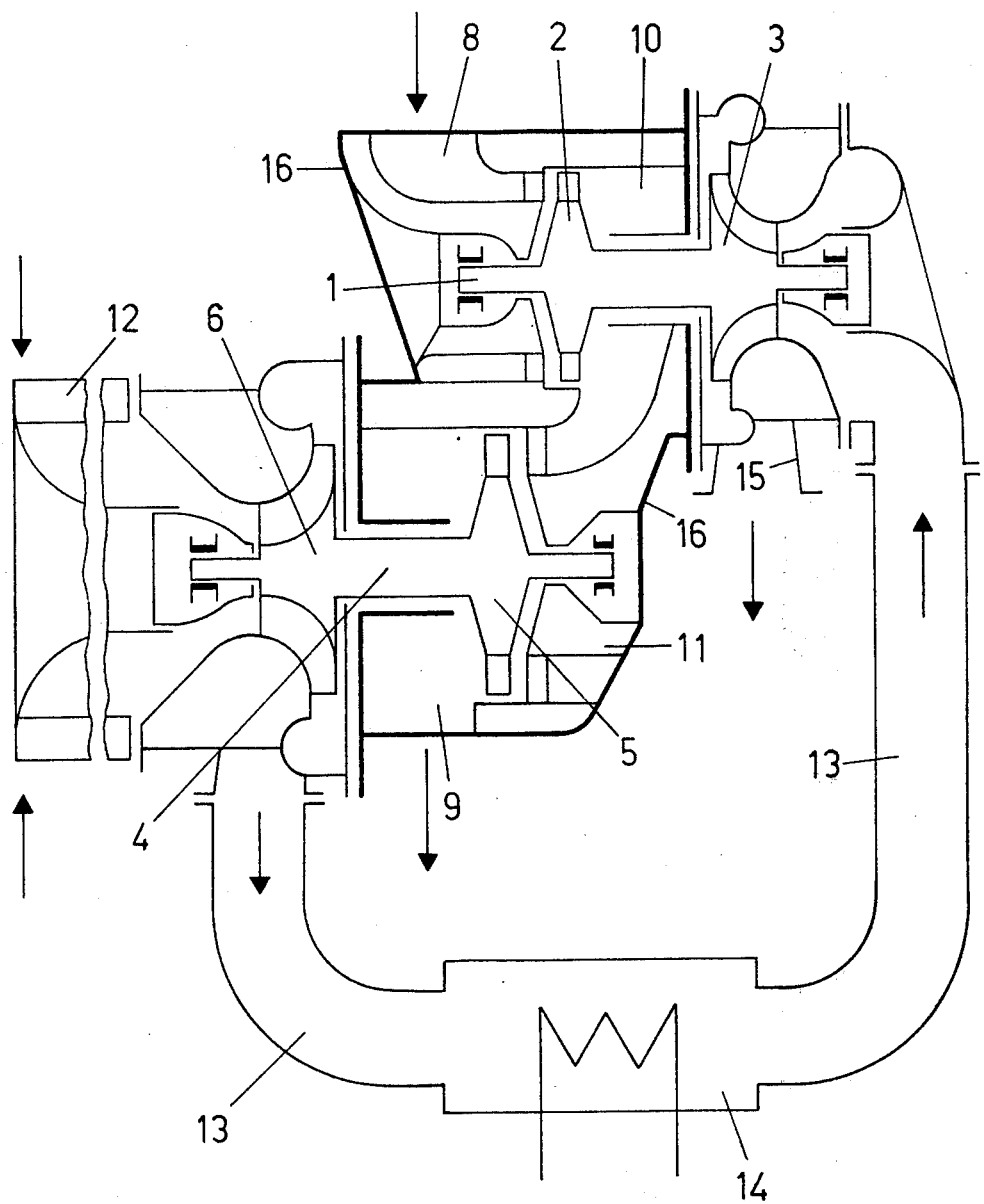
FIG. 2 is a cross-sectional view similar to FIG. 1 of a two-stage exhaust-gas turbocharger having a different embodiment of the common housing of the high-pressure and low-pressure stages.
Figure 3:
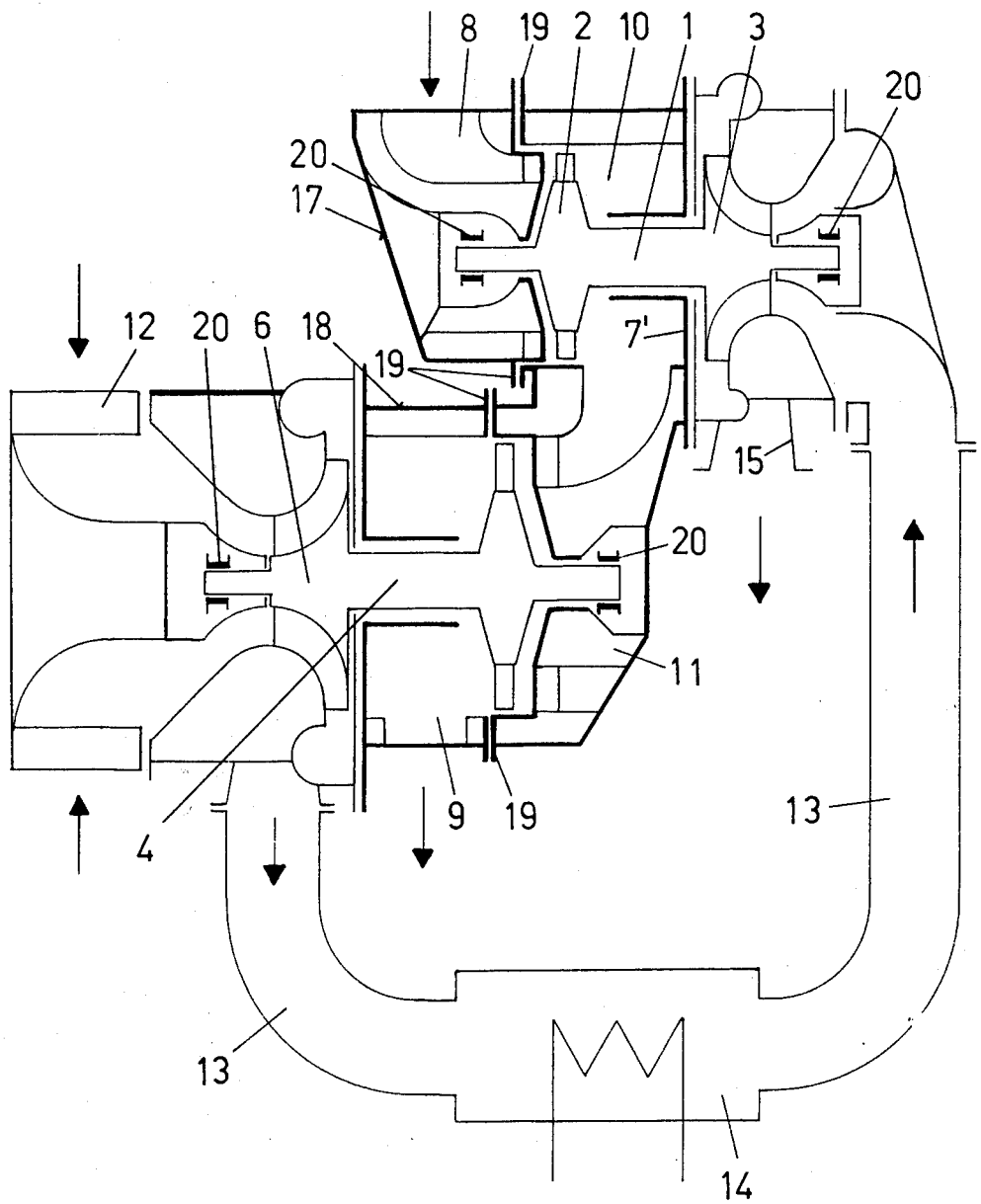
FIG. 3 is a cross-sectional view of a two-stage exhaust-gas turbocharger having separate housings for the gas inlet low-pressure stage.

In FIGS. 1 to 3, the same items are identified by the same reference numerals.

FIG. 1 shows a turbocharger shaft 1 for the high-pressure stage of an exhaust-gas turbocharger. Mounted on one end of the shaft is a turbine wheel 2, and at the other end is a compressor 3. Parallel to and spaced laterally from the axis of shaft 1 of the high-pressure stage is a shaft 4 for the low-pressure stage of the exhaust-gas turbocharger. A turbine wheel 5 of the low-pressure stage is mounted on shaft 4 and is located in the vicinity of the turbine wheel 2 of the high-pressure stage. Mounted at the other end of shaft 4 from the turbine wheel 5 is a low-pressure compressor 6. The ends of shaft 1 adjacent the turbine wheel 2 of the high-pressure stage and the end of shaft 4 adjacent the turbine wheel 5 of the low-pressure stage each have bearings located in a twin housing 7, 7', one part 7 of the twin housing incorporating a high-pressure exhaust-gas inlet 8 and a low-pressure exhaust-gas outlet 9, while the second part 7' of the twin housing, which is rigidly fixed to the first part 7 by means of flange connections 19, incorporates an exhaust-gas outlet 10 of the high-pressure stage and an exhaust-gas inlet 11 of the low-pressure stage. The low-pressure compressor 6 has an air intake 12 through which atmospheric air is passed for initial compression in the low-pressure compressor 6, and then is passed through a duct 13 via a charge-air cooler 14 into the high-pressure compressor 3. From here the more highly compressed air passes through a charge-air outlet 15 to the engine (not shown).

FIG. 2 again shows a cross-section through a two-stage exhaust-gas turbocharger, although in this case a common housing is provided for both the high-pressure stage and the low-pressure stage of the turbocharger, instead of the twin housing 7, 7' of FIG. 1. This common housing 16 contains both the exhaust-gas inlet 8 into the high-pressure section and the exhaust-gas outlet 10 from the high-pressure section, and also the exhaust-gas inlet 11 to the low-pressure section and the low-pressure exhaust-gas outlet 9 from the common housing. The shaft 1 with turbine wheel 2 and compressor 3 of the high-pressure stage, the shaft 4 with turbine wheel 5 and compressor 6 of the low-pressure stage, the air intake 12, the passage of the charge air through the duct 13 and charge-air cooler 14 to the compressor 3 of the high-pressure stage, and the air outlet 15 from the high-pressure stage are arranged in the same manner as described in FIG. 1.

As shown in FIG. 3, the left-hand part of the twin housing 7, 7' depicted in FIG. 1 is further divided in such a way that the high-pressure gas inlet 8 and the low-pressure gas outlet 9 each have a separate portion of housing 17 for the high-pressure section and a further separate portion of housing 18 for the low-pressure section of the exhaust-gas turbocharger, the two portions being connected together by flanges 19 and also to the portion of housing forming a common portion of housing for the exhaust-gas outlet 10 of the high-pressure stage and the exhaust-gas inlet 11 of the low-pressure stage. Any known method of connection could, of course, be used. In this example, also, the bearings and layout of the shaft 1 with turbine wheel 2 and compressor 3 of the high-pressure stage, the shaft 4 with turbine wheel 5 and compressor 6 of the low-pressure stage, the air intake 12, the passage of the charge air through the duct 13 and charge-air cooler 14, and the charge-air outlet 15 are the same as in the configurations of FIGS. 1 and 2.

In all the examples shown, both the end of the shaft 1 of the high-pressure stage and the end of the shaft 4 of the low-pressure shaft adjacent to the compressors are supported in bearings 20, each of which is located on the outside of the turbocharger housing and is thus not directly exposed to the hot exhaust-gas flow, and is, therefore, also easily accessible.

The applications described above are not restricted to what is shown in the drawings. For example, not only the separate housing 17, 18 (as shown in FIG. 3), but also the portion of housing 7' could be of such a form that a special portion of housing is provided for each of the exhaust-gas outlet 10 of the high-pressure stage and exhaust-gas inlet 11 of the low-pressure stage, in which case the two portions of housing could also be joined together by means of flanges.

While specific embodiments of the invention have been shown and described in detail to illustrate the application of the inventive principles, it will be understood that the invention may be embodied otherwise without departing from such principles.

What is claimed is:

1. A two-stage exhaust-gas turbocharger for internal combustion machines comprising at least two turbochargers, each said turbocharger comprising a shaft, and a compressor and an exhaust-gas turbine each mounted in axially spaced relationship on said shaft, a first one of said turbochargers operating as a high pressure stage and a second one of said turbochargers operating as a low pressure stage, means associated with said two-stage exhaust-gas turbocharger for forming a path for compressed air with said compressors in said high pressure stage and said low pressure stage located in the path of said compressed air, said compressor in the low pressure stage of said turbocharger being located ahead of said compressor in the high pressure stage of said turbocharger in the flow path of the compressed air, said turbine in said low pressure stage of said turbocharger being located downstream of said turbine in said high pressure stage of said turbocharger relative to the flow of exhaust-gas through said two-stage exhaust-gas tubocharger, said shafts in each of said turbochargers disposed in laterally spaced parallel relation, said high pressure stage of said turbocharger having an exhaust gas outlet and said low pressure stage of said turbocharger having an exhaust-gas inlet, and a common housing for said turbine in said high pressure stage of said turbocharger and for said turbine in said low pressure stage of said turbocharger with said common housing including the exhaust-gas outlet for said high pressure stage of said turbocharger and the exhaust-gas inlet for said low pressure stage of said turbocharger.

2. A two-stage exhaust-gas turbocharger, as set forth in claim 1, in which said high pressure stage of said turbocharger has an exhaust gas inlet and said low pressure stage of said turbocharger has an exhaust-gas outlet, and a second common housing including said exhaust-gas inlet of said high pressure stage and said exhaust-gas outlet of said low pressure stage.

3. A two-stage exhaust-gas turbocharger, as set forth in claim 2, wherein said common housing containing said exhaust-gas outlet from the high pressure stage and the exhaust-gas inlet to said low pressure stage is detachably connected to said second common housing containing the exhaust-gas inlet to the high pressure stage and the exhaust-gas outlet from the low pressure stage.

4. A two-stage exhaust-gas turbocharger, as set forth in claim 1, wherein the high pressure stage has an exhaust-gas inlet and the low pressure stage has an exhaust-gas outlet, and a separate housing for each of said exhaust-gas inlet of the high pressure stage and said exhaust-gas outlet from the low-pressure stage.

5. A two-stage exhaust-gas turbocharger, as set forth in claim 1, wherein said high pressure stage has an exhaust-gas inlet and said low-pressure stage has an exhaust-gas outlet, and said common housing includes said exhaust-gas inlet and outlet of said high pressure stage and said exhaust-gas inlet and outlet of said low pressure stage.

6. A two-stage exhaust-gas turbocharger, as set forth in claim 4, including means for detachably connecting said common housing and said separate housings together.

7. A two-stage exhaust-gas turbocharger, as set forth in claim 1, wherein said turbocharger includes a housing enclosing said high pressure stage and said low pressure stage of said turbochargers, said housing including said common housing, and bearings for said shafts for said high pressure stage of said turbocharger and said low pressure stage of said turbocharger which said bearings are located outside of said housing of said turbocharger.

* * * * *